(12) United States Patent
Aoyama

(10) Patent No.: US 8,261,795 B2
(45) Date of Patent: Sep. 11, 2012

(54) PNEUMATIC RADIAL TIRE FOR HEAVY LOAD

(75) Inventor: Masanori Aoyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 792 days.

(21) Appl. No.: 12/306,771

(22) PCT Filed: Jun. 28, 2007

(86) PCT No.: PCT/JP2007/063029
§ 371 (c)(1),
(2), (4) Date: Jan. 27, 2009

(87) PCT Pub. No.: WO2008/001862
PCT Pub. Date: Jan. 3, 2008

(65) Prior Publication Data
US 2009/0277556 A1    Nov. 12, 2009

(30) Foreign Application Priority Data
Jun. 29, 2006    (JP) ................................ 2006-179581

(51) Int. Cl.
*B60C 9/18* (2006.01)
(52) U.S. Cl. ............ 152/526; 152/527; 152/536; 57/902
(58) Field of Classification Search .................. 152/526, 152/527, 535, 536; 57/902
See application file for complete search history.

(56) References Cited

U.S. PATENT DOCUMENTS
4,679,387 A * 7/1987 Weidenhaupt et al. ....... 152/527
(Continued)

FOREIGN PATENT DOCUMENTS
EP    1 001 074 A2    5/2000
(Continued)

OTHER PUBLICATIONS
English Machine Translation of Inoue (JP2005-104437). No date.*
(Continued)

*Primary Examiner* — Justin Fischer
*Assistant Examiner* — Robert Dye
(74) *Attorney, Agent, or Firm* — Sughrue Mion, PLLC

(57) ABSTRACT

There are provided a pneumatic radial tire of heavy load vehicles, in which durability of a belt is improved.

A pneumatic radial tire for heavy load vehicles comprises a pair of bead portions in each of which a bead core is embedded, a radial carcass ply 1 extending from one bead portion to the other bead portion and turned around the bead core from an inner side to an outer side of the bead core in a width direction of the tire and at least six belt layers 2 disposed on an outer side of this radial carcass ply 1 in a radial direction of the tire, wherein the following relations are satisfied: $W_{56} > W_{34} > W_{12}$, where $W_{12}$ is a maximum width of first and second belts 2a f the belt layers 2, $W_{34}$ is a maximum width of third and forth belts 2b of the belt layers 2 and $W_{56}$ is a maximum width of fifth and sixth belts 2c of the belt layers 2; and $1 > D_{12}/D_{34} > 0.6$, where $D_{12}$ is a cord diameter of the first and second belts and $D_{34}$ is a cord diameter of the third and forth belts. In addition, a steel cord of each belt layer has a double twist structure in which a plurality of steel filaments are twisted to form a cable and two to ten cables are further twisted.

2 Claims, 2 Drawing Sheets

U.S. PATENT DOCUMENTS

| | | | | |
|---|---|---|---|---|
| 5,327,954 A | * | 7/1994 | Nakamura | 152/527 |
| 5,591,284 A | * | 1/1997 | Gaudin | 152/532 |
| 5,661,966 A | | 9/1997 | Matsumaru | |
| 5,688,344 A | * | 11/1997 | Kobayashi et al. | 152/527 |
| 5,722,226 A | | 3/1998 | Matsumaru | |

FOREIGN PATENT DOCUMENTS

| | | | |
|---|---|---|---|
| JP | 06-173179 | * | 6/1994 |
| JP | 07017211 | | 1/1995 |
| JP | 9-13289 A | | 1/1997 |
| JP | 11-170809 A | | 6/1999 |
| JP | 11-348509 A | | 12/1999 |
| JP | 2000-154483 | | 6/2000 |
| JP | 2001-301418 A | | 10/2001 |
| JP | 2002-362109 A | | 12/2002 |
| JP | 2005-104437 A | | 4/2005 |
| JP | 2006-22413 A | | 1/2006 |

OTHER PUBLICATIONS

European Search Report issued in Application No. 07767822.5 dated Dec. 28, 2011.

* cited by examiner

PNEUMATIC RADIAL TIRE FOR HEAVY LOAD

This is a National Stage Entry of Application No. PCT/JP2007/063029 filed Jun. 28, 2007, which claims priority from JP 2006-179581, filed Jun. 29, 2006, which are hereby incorporated by reference in their entirety.

TECHNICAL FIELD

The present invention relates to a pneumatic radial tire for heavy load, which is preferable to be mounted on a truck, a bus, a construction vehicle or the like, and particularly intends to improve durability of a belt.

RELATED ART

In general, a pneumatic radial tire for heavy load vehicles such as a truck, a bus, a construction vehicle or the like comprises main intersecting belt layers in which steel cords arranged in a comparatively large inclination angle with respect to the circumferential direction of the tire are embedded, two or more small-inclination belt layers disposed on the inner side of the main intersecting belt layers in which cords arranged in a small inclination angle with respect to the circumferential direction of the tire are embedded, and a protecting layer disposed on the outer side of the main intersecting layers and having a larger belt width than that of the main intersecting layers in which cords arranged in a large inclination angle with respect to the circumferential direction of the tire are embedded (for example, see JP2002362109).

In such a conventional belt, cords are arranged in mutually opposite directions with respect to the circumferential direction of the tire between adjacent layers in order to assure stiffness in the circumferential and width directions of the tire. More specifically, the main intersecting belt layers assure stiffness (lateral stiffness, in-plan bending stiffness and the like) against deformation along the plane of the belt, the small-inclination belt layers bears the tension of the tread in the circumferential direction to restrain radial expansion of the tread and to restrain change of crown shape during running, and the protecting layer avoids a break and damage of each layers due to a projecting input from a road surface.

Recently, as a vehicle shows a higher accuracy, increasing durability of a tire under higher speed and higher load condition has been demanded. In particular, since a vehicle used in a mine or the like runs a bad road with a high load, further improvement of heat durability, cut resistance to a wound and the like is demanded. However, such further improvement by means of conventional techniques almost reaches a limit due to an increase of a tire size with an increase of a vehicle size.

A tire for mine vehicles applicable to upsized vehicles in which at least six belt layers respectively serving a function of a hoop effect, a stiffness effect, a cut protection effect and the like, disposed on a crown portion of a carcass forming a frame of the tire is known (for example, see JP2005104437). However, a higher level of durability, particularly cut penetration resistance has been demanded from the market.

DISCLOSURE OF THE INVENTION

The object of the present invention is to solve the above-mentioned conventional problems and to provide a pneumatic radial tire for heavy load vehicles intending to further improve durability of a belt.

A pneumatic radial tire for heavy load vehicles according to the present invention comprises a pair of bead portions in each of which a bead core is embedded, a radial carcass ply extending from one bead portion to the other bead portion and turned around the bead core from an inner side to an outer side of the bead core in a width direction of the tire and at least six belt layers disposed on an outer side of this radial carcass ply in a radial direction of the tire, wherein the following relations are satisfied:

$W_{56} > W_{34} > W_{12}$, where $W_{12}$ is a maximum width of first and second belts of the belt layers, $W_{34}$ is a maximum width of third and forth belts of the belt layers and $W_{56}$ is a maximum width of fifth and sixth belts of the belt layers; and $1 > D_{12}/D_{34} > 0.6$, where $D_{12}$ is a cord diameter of the first and second belts and $D_{34}$ is a cord diameter of the third and forth belts, and a steel cord of each belt layer has a double twist structure in which a plurality of steel filaments are twisted to form a cable and two to ten cables are further twisted.

In the pneumatic radial tire for heavy load vehicles according to a non-limiting embodiment, it is preferable that a cord of the first and second belts has an arrangement angle $\theta_2$ of not more than 10 degrees with respect to a circumferential direction of the tire, a sheath strand of the cord of the first and second belts has a twist angle $\theta_1$ with respect to an axis center of the cord having a range of 3 degrees $\leq \theta_1 \leq$ 13 degrees and the relation of $2.0 > \theta_2/\theta_1 > 0.4$ is satisfied.

In the pneumatic radial tire for heavy load vehicles, it is preferable that the steel filament has a diameter of 0.15 mm to 0.40 mm.

A sufficient hoop effect, a stiffness effect and a cut protection effect can be achieved by setting each of the maximum width of the first and second belts, the third and forth belts and the fifth and sixth belts of the belt layers so as to satisfy the relation of $W_{56} > W_{34} > W_{12}$.

In addition, sufficient cut penetration resistance can be assured without degrading heat durability by setting the ratio of the cord diameter $D_{12}$ of the first and second belts to the cord diameter $D_{34}$ of the third and forth belts in a range of $1 > D_{12}/D_{34} > 0.6$.

Even if the belt is cut to have a constant width in such a manner that the cords are inclined to the cut surface, the cord section does not spread in the cut surface so as to assure separation resistance in the belt edges inside the tire by setting the cord of the first and second belts to have an arrangement angle $\theta_2$ of not more than 10 degrees, preferably within a range of 2 degrees and 8 degrees with respect to the circumferential direction of the tire, by setting the sheath strand of the cord of the first and second belts to have a twist angle $\theta_1$ with respect to an axis center of the cord having a range of 3 degrees $\leq \theta_1 \leq$ 13 degrees, preferably a range of 5 degrees $\leq \theta_1 \leq$ 10 degrees, and by satisfying the relation of $2.0 > \theta_2/\theta_1 > 0.4$.

Figure 1:
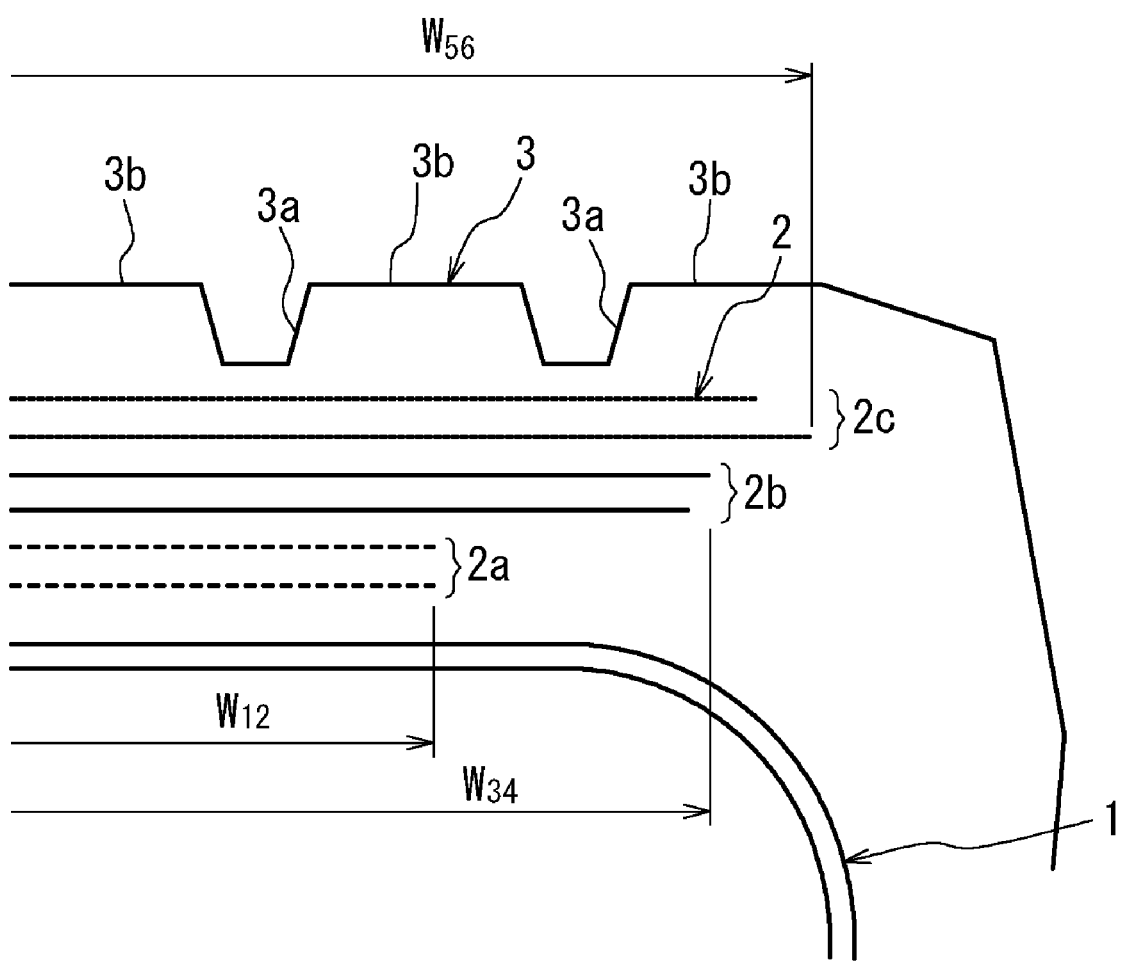
FIG. 1 is a view showing a cross-section of only a half side of a tire according to an embodiment of a pneumatic radial tire of the present invention.

| | |
|---|---|
| DESCRIPTION OF REFERENCE NUMERALS | |
| 1 | radial carcass ply |
| 2 | belt layer |
| 2a | first and second belts |
| 2b | third and forth belts |
| 2c | fifth and sixth belts |
| 3 | tread rubber layer |

BEST MODE FOR CARRYING OUT THE INVENTION

Hereinafter, the present invention will be described more specifically with reference to the drawings.

FIG. 1 is a view showing a cross-section (in the width direction of a tire) of only a half (right) side of a pneumatic radial tire for a heavy load vehicle, which is preferable to be mounted on a construction vehicle or the like.

The reference numeral 1 in FIG. 1 denotes a radial carcass ply forming a frame of a tire. This radial carcass ply 1 extends from one bead portion (not shown) to the other and is turned around the bead core from an inner side to an outer side of the bead core to be anchored.

The reference numeral 2 denotes belt layers disposed on the outer side of the radial carcass ply 1. These belt layers 2 consist of first and second belts 2a, which are disposed adjacent to the carcass ply 1, third and forth belts 2b, which are disposed on the first and second belts 2a and fifth and sixth belts 2c, which are disposed on the third and forth belts 2b. The relation of W56>W34>W12 is satisfied, where W12 is a maximum width of the first and second belts 2a, W34 is a maximum width of the third and forth belts 2b and W56 is a maximum width of the fifth and sixth belts 3c as well as the relation of 1>D12/D34>0.6 is satisfied, where D12 is a cord diameter of the first and second belts 2a and D34 is a cord diameter of the third and forth belts 2b.

Figure 2:
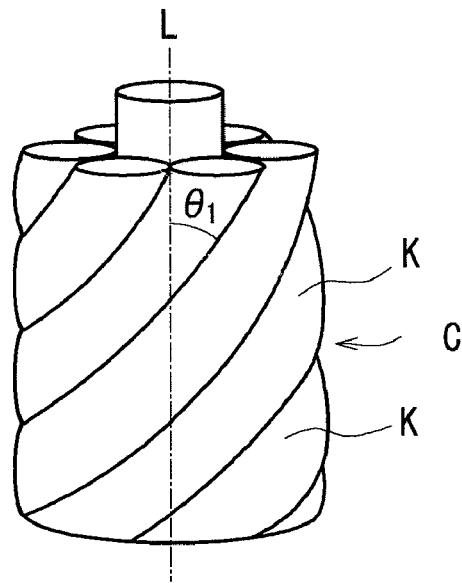
FIG. 2 is a view showing an appearance of an essential part of a steel cord.

As shown in FIG. 2, a steel cord C comprised of each of the belts 2a, 2b, 2c preferably has a double twist structure in which a plurality of steel filaments are twisted to form a cable k and two to ten cables k are further twisted. The steel filament comprised of the cord C preferably has a diameter of 0.15 mm to 0.40 mm, more preferably 0.20 mm to 0.34 mm.

The reference numeral 3 denotes a tread rubber layer. There are provided in the tread rubber layer 3 a plurality of groove portions 3a, which define land portions 3b.

The pneumatic radial tire having the above-mentioned configuration can maintain separation performance in the edges of the belt, a hoop effect and a stiffness effect without degrading heat durability and improve cut penetration resistance and thus significantly improve durability of the belt.

Figure 3:
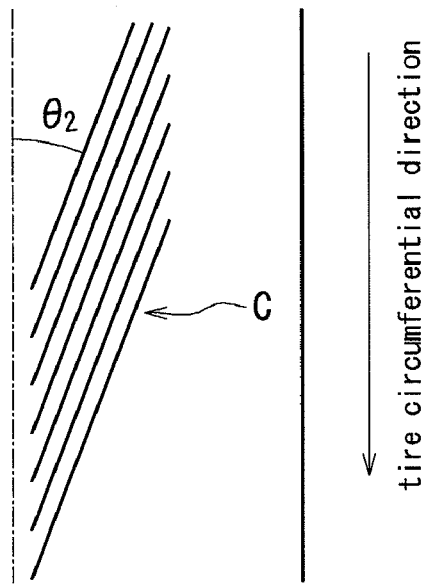
FIG. 3 is a view schematically showing a cord arrangement of a belt.

In the present invention, as shown in FIG. 3, a cord of the first and second belts 2a preferably has an arrangement angle $\theta_2$ of not more than 10 degrees, more preferably within a range of 2 degrees and 8 degrees with respect to the circumferential direction of the tire. In addition, as shown in FIG. 2, a sheath strand of the cord of the first and second belts 2a preferably has a twist angle $\theta_1$ with respect to an axis center L of the cord having a range of 3 degrees$\leq \theta_1 \leq$13 degrees, more preferably a range of 5 degrees$\leq \theta_1 \leq$10 degrees, and the relation of $2.0>\theta_2/\theta_1>0.4$ is preferably satisfied. As a result, it is possible to keep original stiffness of steel cords and assure a hoop effect. When the belt is cut, the cord section does not spread so as to assure separation resistance within the tire by setting $2.0>\theta_2/\theta_1>0.4$.

In order to assure strength and fatigue resistance, the diameter of the steel filament is preferably 0.15 mm to 0.40 mm, more preferably 0.20 mm to 0.34 mm.

EXAMPLE

Pneumatic radial tires (for mine vehicles, having the same structure except for a maximum width of a belt and a cord diameter of first and second belts as well as third and forth belts) having a size of 53/80R63 are produced, each of which comprises belt layers having different maximum widths. The tire is mounted on a regular rim (filling air pressure: 600 kPa). Then, a running experiment is performed using each tire under the following condition to examine heat condition in the belt edges and cut penetration. The results are shown in Table 1.

In Table 1, the width of the belt layers is shown in an index value with the width of the fifth and sixth belts being defined as 100 and the cord diameter of the belt layers is shown in an index value with the cord diameter of the third and forth belts being defined as 100.

The heat condition in the belt edges is obtained by measuring the temperature in the edges of the second belt in the width direction of the tire and shown in an index value with the temperature of the reference tire being defined as 100 (the closer value to 100 means the better results). The cut penetration is estimated from a penetration examination with a model tire and shown in an index value with the reference tire being defined as 100 (the closer value to 100 means the better results).

Condition:

A tire of 53/80R63 is mounted on a rim of 36.00/5.0 with a load of 124.8 t and it runs in the speed of 10 km/h. The temperature of the edges of the second belt 2B is measured after 1 h after the run.

TABLE 1

| | | Reference tire | Example tire 1 | Example tire 2 | Example tire 3 | Comparative Example tire 1 | Comparative Example tire 2 |
|---|---|---|---|---|---|---|---|
| Maximum width of belt layer | first and second belts | 50 | 50 | 80 | 80 | 50 | 80 |
| | third and forth belts | 90 | 90 | 90 | 90 | 90 | 90 |
| | fifth and sixth belts | 100 | 100 | 100 | 100 | 100 | 100 |
| Cord diameter of belt | first and second belts | 50 | 70 | 70 | 85 | 100 | 100 |
| | third and forth belts | 100 | 100 | 100 | 100 | 100 | 100 |
| Heat condition | | 100 | 102 | 101 | 103 | 108 | 106 |
| Cut penetration | | 100 | 115 | 115 | 140 | 155 | 155 |

As is apparent from Table 1, it is confirmed that Example tires 1-3 show smaller temperature increase due to heat generation than that of Comparative Example tires 1, 2 and show better results of cut penetration.

It is possible to provide a pneumatic radial tire for heavy load vehicles having small heat generation in the edges of the belt in the width direction of the tire as well as improving cut penetration.

The invention claimed is:

1. A pneumatic radial tire for heavy load vehicles comprising a pair of bead portions in each of which a bead core is embedded, a radial carcass ply extending from one bead portion to the other bead portion and turned around the bead core from an inner side to an outer side of the bead core in a width direction of the tire and at least six belt layers disposed on an outer side of this radial carcass ply in a radial direction of the tire, wherein
the following relations are satisfied:
$W_{56} > W_{34} > W_{12}$, where $W_{12}$ is a maximum width of first and second belts of the belt layers, $W_{34}$ is a maximum width of third and fourth belts of the belt layers and $W_{56}$ is a maximum width of fifth and sixth belts of the belt layers; and
$1 > D_{12}/D_{34} > 0.6$, where $D_{12}$ is a cord diameter of the first and second belts and $D_{34}$ is a cord diameter of the third and fourth belts, and
a steel cord of each belt layer has a double twist structure in which a plurality of steel filaments are twisted to form a cable and two to ten cables are further twisted,
wherein the first and second belts are disposed adjacent to the outer side of the radial carcass ply, the third and fourth belts are disposed on the first and second belts and the fifth and sixth belts are disposed on the third and fourth belts,
wherein
a cord of the first and second belts has an arrangement angle $\theta 2$ of not more than 10 degrees with respect to a circumferential direction of the tire,
a sheath cable of the cord of the first and second belts has a twist angle $\theta 1$ with respect to an axis center of the cord having a range of 3 degrees $\leq \theta 1 \leq 13$ degrees, and
the following relation is satisfied:
$2.0 > \theta_2/\theta_1 > 0.4$.

2. The pneumatic radial tire for heavy load vehicles according to claim 1, wherein the steel filament has a diameter of 0.15 mm to 0.40 mm.

* * * * *